United States Patent
Deley, Jr. et al.

(10) Patent No.: US 10,427,210 B2
(45) Date of Patent: *Oct. 1, 2019

(54) BARREL TANK SEAM WELDER SYSTEM

(71) Applicant: Taylor-Winfield Technologies, Inc., Youngstown, OH (US)

(72) Inventors: Francis L. Deley, Jr., Boardman, OH (US); Jason Garrett Lisko, Girard, OH (US); Brian Rea, Boardman, OH (US); Jeffery Bell, Newton Falls, OH (US); Michael A. Gaskill, Salem, OH (US)

(73) Assignee: Taylor-Winfield Technologies, Inc., Youngstown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,356

(22) Filed: Jan. 8, 2019

(65) Prior Publication Data

US 2019/0134697 A1    May 9, 2019

Related U.S. Application Data

(63) Continuation of application No. 15/989,555, filed on May 25, 2018, which is a continuation of application
(Continued)

(51) Int. Cl.
*B21J 5/00* (2006.01)
*B23K 37/02* (2006.01)
(Continued)

(52) U.S. Cl.
CPC ........... *B21J 5/002* (2013.01); *B21C 37/0815* (2013.01); *B21C 37/0822* (2013.01);
(Continued)

(58) Field of Classification Search
CPC ............ B21C 37/0822; B21C 37/0815; B23K 11/0873; B23K 11/0876; B23K 11/063; B23K 37/0211; B23K 13/025
(Continued)

(56) References Cited

U.S. PATENT DOCUMENTS

| 2,404,632 A | 7/1946 | Hansen |
| 2,792,799 A | 5/1957 | Dahlstrom |

(Continued)

OTHER PUBLICATIONS

Servomotor. (May 25, 2017). In *Wikipedia, The Free Encyclopedia*. Retrieved 08:23, Jun. 12, 2017 from https: //en.wikipedia.org/w/index.php?title=Servomotor&oldid=782272150.

*Primary Examiner* — Ibrahime A Abraham
*Assistant Examiner* — John J Norton
(74) *Attorney, Agent, or Firm* — Fay Sharpe LLP (57) ABSTRACT

An apparatus (10) for joining a predetermined geometrical profile shape from a sheet material (SM) includes a positioning assembly (12) including a base member (14) and a frame (16) that is operable to receive the sheet material (SM), to configure the sheet material in a predetermined orientation and to linearly translate the sheet material along a process direction (20). A Z-bar (22) is configured to guide a first longitudinal edge (FE) and second longitudinal edge (SE) of the sheet material (SM) into adjacent alignment along the process direction (20). A welding and forging assembly (60) welds and then forges a seam between the first longitudinal edge (FE) and the second longitudinal edge (SE) of the associated sheet material (SM).

16 Claims, 8 Drawing Sheets

Related U.S. Application Data

No. 15/703,136, filed on Sep. 13, 2017, which is a continuation-in-part of application No. 14/824,101, filed on Aug. 12, 2015, now Pat. No. 10,150,176, which is a continuation-in-part of application No. 14/288,605, filed on May 28, 2014, now abandoned.

(51) Int. Cl.
| | | |
|---|---|---|
| *B23K 13/01* | (2006.01) | |
| *B21C 37/08* | (2006.01) | |
| *B23K 11/06* | (2006.01) | |
| *B23K 11/087* | (2006.01) | |
| *B23K 13/02* | (2006.01) | |
| *B23K 101/12* | (2006.01) | |

(52) U.S. Cl.
CPC ........ *B23K 11/063* (2013.01); *B23K 11/0876* (2013.01); *B23K 13/01* (2013.01); *B23K 13/025* (2013.01); *B23K 37/0211* (2013.01); *B23K 37/0258* (2013.01); *B23K 2101/12* (2018.08)

(58) Field of Classification Search
USPC .......................................................... 219/61.3
See application file for complete search history.

(56) References Cited

U.S. PATENT DOCUMENTS

| | | |
|---|---|---|
| 3,017,495 A | 1/1962 | Woodward |
| 3,021,416 A | 2/1962 | Mallett et al. |
| 3,102,189 A | 8/1963 | Jones et al. |
| 3,178,554 A | 4/1965 | Cooper et al. |
| 3,198,413 A | 8/1965 | Cooper |
| 3,247,692 A | 4/1966 | Davis |
| 3,278,718 A | 10/1966 | Seeloff |
| 3,301,994 A | 1/1967 | Seeloff |
| 3,431,383 A | 3/1969 | Ullery, Jr. et al. |
| 3,601,570 A | 8/1971 | Davis |
| 3,834,010 A | 9/1974 | Wolfe |
| 3,889,617 A * | 6/1975 | Lorenzen ............ B21D 51/2676 72/368 |
| 4,197,441 A | 4/1980 | Rudd |
| 4,214,140 A * | 7/1980 | Opprecht ............... B23K 11/06 219/61.13 |
| 4,223,196 A | 9/1980 | Erlandson |
| 4,272,004 A | 6/1981 | Nilsen |
| 4,296,293 A | 10/1981 | Gerber |
| 4,299,108 A | 11/1981 | Kato |
| 4,354,090 A | 10/1982 | Nilsen |
| 4,540,879 A | 9/1985 | Haerther |
| 4,571,476 A * | 2/1986 | Pazzaglia ............. B23K 11/063 219/61.3 |
| 4,649,251 A | 3/1987 | Kai |
| 4,719,329 A | 1/1988 | Matsuno |
| 4,732,026 A | 3/1988 | Ban |
| 4,824,007 A | 4/1989 | Depaoli et al. |
| 4,830,258 A | 5/1989 | Lentz |
| 4,865,243 A | 9/1989 | Meier |
| 4,905,885 A | 3/1990 | Hellman, Sr. |
| 4,912,292 A | 3/1990 | Hartz |
| 4,956,536 A | 9/1990 | Pazzaglia |
| 5,140,123 A | 8/1992 | Mitani |
| 5,366,137 A | 11/1994 | Gysi |
| 5,497,935 A | 3/1996 | Gravier |
| 5,567,335 A | 10/1996 | Baessler |
| 5,732,874 A | 3/1998 | Borzym |
| 5,789,718 A * | 8/1998 | Fukushima .......... B23K 11/061 219/83 |
| 5,841,094 A | 11/1998 | Baumgartner |
| 6,452,128 B1 | 9/2002 | Muller |
| 6,495,792 B1 | 12/2002 | Gysi |
| 6,629,632 B1 | 10/2003 | Jack |
| 6,750,420 B1 | 6/2004 | Gysi |
| 6,828,523 B1 | 12/2004 | Gysi |
| 8,803,023 B2 | 8/2014 | Agashe |
| 10,150,176 B2 * | 12/2018 | Deley, Jr. ............. B23K 11/063 |
| 2004/0035855 A1 | 2/2004 | Witte |
| 2010/0272542 A1 | 10/2010 | Mueller |

* cited by examiner

BARREL TANK SEAM WELDER SYSTEM

RELATED APPLICATIONS

This application is a continuation of U.S. patent application Ser. No. 15/989,555, filed on May 25, 2018, which is a continuation of U.S. patent application Ser. No. 15/703,136, filed on Sep. 13, 2017, which is a continuation-in part of U.S. patent application Ser. No. 14/824,101, filed on Aug. 12, 2015, which is a continuation-in-part of U.S. patent application Ser. No. 14/288,605, filed on May 28, 2014, all of which are hereby incorporated by reference in their entireties.

BACKGROUND

The present application relates to a system of welding material into a shape of a barrel having a geometric profile of a cylinder or tube. More particularly, this application relates to a system and a device for the orientation and longitudinal movement of sheet metal in relation to a welding apparatus for the joining of longitudinal edges of the sheet metal to create generally rounded metal bodies. However, it is to be appreciated that the described technique is also amenable to other applications such as creating various predetermined geometric profile shapes.

In one instance, barrels or drums are utilized in many industries and are required to maintain a leak tight seal to transport and store various fluid materials therein. Known methods and systems for the construction of barrels include the contortion and welding of thin wall metal material into a cylindrical or tubular orientation and subsequently providing end caps at opposing ends. Notably, barrels are not limited to generally cylindrical shaped geometric profiles. To form the outer walls of the barrel, longitudinal edges of the thin wall sheet or sheet metal are introduced into a welding apparatus such that the longitudinal edges are contorted to abut one another while the remaining sheet material is oriented into a rounded orientation. The longitudinal edges of the sheet metal are positioned in close proximity with respect to each other, are abutted and/or overlapped to create a seam. An electrical potential is applied to the seam by a welding assembly to cause welding between the longitudinal edges.

Those skilled in the art have attempted various methods including introducing the longitudinal edges of the formed sheet metal into a Z-shaped frame such as a Z-bar. The sheet metal is translated through the frame while being supported by a plurality of rollers. The longitudinal edges are abutted and a welding apparatus welds the longitudinal edges creating a solid phase bond.

However, known systems are subject to the rebounding, vibratory or "springy" nature of sheet metal. The translation and support of the longitudinal edges can cause "oil canning" or unwanted bending of the sheet material within the frame of the assembly. Additionally, it is a challenge to abut, align and/or overlap the longitudinal edges of the sheet material with accuracy while the sheet material is translating through the frame.

SUMMARY

It has been found that certain new materials, such as advance high strength steel (AHSS) used in certain applications are more difficult to weld with existing technology. This results in reduced weld/bond quality, reduced weld toughness, increased seam thickness and an overall lower quality weld. Accordingly, the present application sets forth a method and apparatus for forming a cylindrical shape (or other shape) from a sheet of material that includes partially bonding narrowly overlapped sheet ends with a leading set of weld wheels (e.g., via resistance welding), followed by heating (e.g., via induction heating) the partially bonded sheet ends to a significant temperature and then forging the heated seam with closely positioned forging wheels. The action of the induction heating and forging increases the quality and scope of the "solid phase" bond weld (sheet) interface while also reducing the weld to parent metal thickness ratio. The reduced thickness ratio and increased weld quality is desirable in many "mash seam weld" applications including, but not limited to, pressure vessels, water tanks, and strip welding processes.

In accordance with one aspect of the present disclosure, an apparatus for joining a predetermined geometric profile shape from an associated sheet material comprises a positioning assembly including a base member and a frame that is operable to receive the associated sheet material, configure the associated sheet material in a predetermined orientation and translate the associated sheet material along a process direction, a guide member attached to the base member that is configured to guide a first longitudinal edge and a second longitudinal edge of the associated sheet material into adjacent alignment along the process direction, a plurality of arms attached to the frame, each arm including a roll wherein at least one roll is configured to be translated inwardly against the associated sheet material and outwardly away from the associated sheet material to adjust a radial position of the associated sheet material, and a welding and forging assembly for creating a solid-phase bond between the first longitudinal edge and the second longitudinal edge of the associated sheet material.

The welding and forging assembly can include a heating unit for heating at least a portion of the first longitudinal edge and the second longitudinal edge of the associated sheet material after welding and prior to forging, and can include at least one pair of forging wheels configured to apply pressure to the first longitudinal edge and the second longitudinal edge of the associated sheet material. A controller can be configured to control the apparatus such that the plurality of elongated segments are automatically movable relative to a body of the guide member to adjust the lateral position of the first and second longitudinal edges of the associated sheet material as the associated sheet material is linearly translated along the process direction. The plurality of arms can be aligned along a common plane on the frame and are radially spaced about a circumference of the associated sheet material.

The controller can be configured to control the apparatus such that at least one of the plurality of rolls can be automatically translated inwardly against the associated sheet material and outwardly away from the associated sheet material to adjust the radial position of the associated sheet material as the associated sheet material is translated along the process direction. The apparatus can further include a sensor configured to sense a presence of the sheet material and generate a part in position signal. In one embodiment, the controller can be configured to receive the part in position signal, control the arms to translate the rolls inwardly or outwardly, control the welding and forging assembly to initially weld the first and second longitudinal edges in coordination with advancement of the associated sheet material as it translates along the process direction, subsequently forge the first and second longitudinal edges after welding.

In accordance with another aspect, a method of controlling an apparatus for joining a sheet material into a predetermined geometric profile shape comprises setting an overlap between a first longitudinal edge and a second longitudinal edge of the sheet material, generating a control signal to be received by a welding and forging apparatus to manipulate at least one of a plurality of arms attached to a frame wherein each arm includes a roll such that at least one roll is configured to be translated inwardly against the sheet material and outwardly away from the sheet material to contain the overlap and shape of the first longitudinal edge and the second longitudinal edge, and generating a control signal to be received by the welding and forging assembly to weld a seam between the first longitudinal edge and the second longitudinal edge of the sheet material and, subsequently, forge the seam after welding.

In one embodiment, the method can further include generating a control signal to manipulate at least one of a plurality of elongated segments configured in relative alignment to receive the first longitudinal edge and the second longitudinal edge of the sheet material, each segment being movable relative to a body of the apparatus to adjust the sensed overlap of the first and second longitudinal edges of the sheet material until the overlap conforms to the preselected overlap, and/or generating a control signal to be received by the apparatus to manipulate a robotic tool changing device configured to remove at least one of the plurality of rolls from the arms on the frame of the apparatus, and/or generating a control signal to be received by the apparatus to manipulate a robot configured to remove at least one of the plurality of rolls from one of the arms on the frame of the apparatus, retrieve a different roll of a different size, and mount the roll of the different size to the one of the arms, and/or generating a control signal to be received by the apparatus to manipulate a feed rate of the sheet material along a process direction.

In accordance with another aspect, a method of joining a sheet material into a predetermined geometrical profile shape comprises translating a sheet material along a process direction, receiving a first longitudinal edge of the sheet material within a first channel of a guide member and a second longitudinal edge of the sheet material within a second channel of the guide member, positioning the sheet material within a frame having a plurality of arms positioned radially around an outer surface of the sheet material, adjusting the radial position of the sheet material by translating at least one of the plurality of arms inwardly against the sheet material or outwardly away from the sheet material as the sheet material is translated along the process direction, welding the first longitudinal edge to the second longitudinal edge, and forging at least a welded portion of the first longitudinal edge and the second longitudinal edge.

In accordance with still another aspect, an apparatus for joining an associated sheet material comprises a positioning assembly including a base member and a frame that is operable to receive the associated sheet material, configure the associated sheet material into a predetermined geometrical profile shape and translate the associated sheet material along a process direction, a guide member attached to the base member that is configured to guide a first longitudinal edge and second longitudinal edge of the associated sheet material into adjacent alignment along the process direction, wherein the guide member includes a body having a first channel configured for receiving the first longitudinal edge of the associated sheet material and a second channel configured for receiving the second longitudinal edge of the associated sheet material, the first channel and second channel each include a distal end and a opposite proximal end wherein the associated sheet material is configured to be received at the distal ends and guided into adjacent alignment at the proximal ends, wherein at least one of the first and second channels includes a plurality of elongated segments, each segment is configured to be movable relative to the body of the Z-bar to adjust a lateral position of the first and second longitudinal edges of the associated sheet material, a plurality of arms attached to the frame, each arm including a roll for supporting the associated sheet material, a welding assembly for welding a seam between the first longitudinal edge and the second longitudinal edge of the associated sheet material, and a forging assembly for forging the seam after welding.

One advantage resides in quality, radial and lateral adjustability of the sheet material prior to and/or as it is translated along the process direction.

Another advantage resides in the ability to make these adjustments prior to and/or as the sheet material is being translated and welded.

Another advantage resides in the ability to easily remove and replace the rolls of the arms to accommodate a range of cylindrical sizes.

Yet another advantage resides in increased quality and scope of the solid phase bond weld (sheet) interface while also reducing the weld to near-parent metal thickness ratio.

Still other features and benefits of the present disclosure will become apparent from the following detailed descriptions.

DETAILED DESCRIPTION

Figure 1:
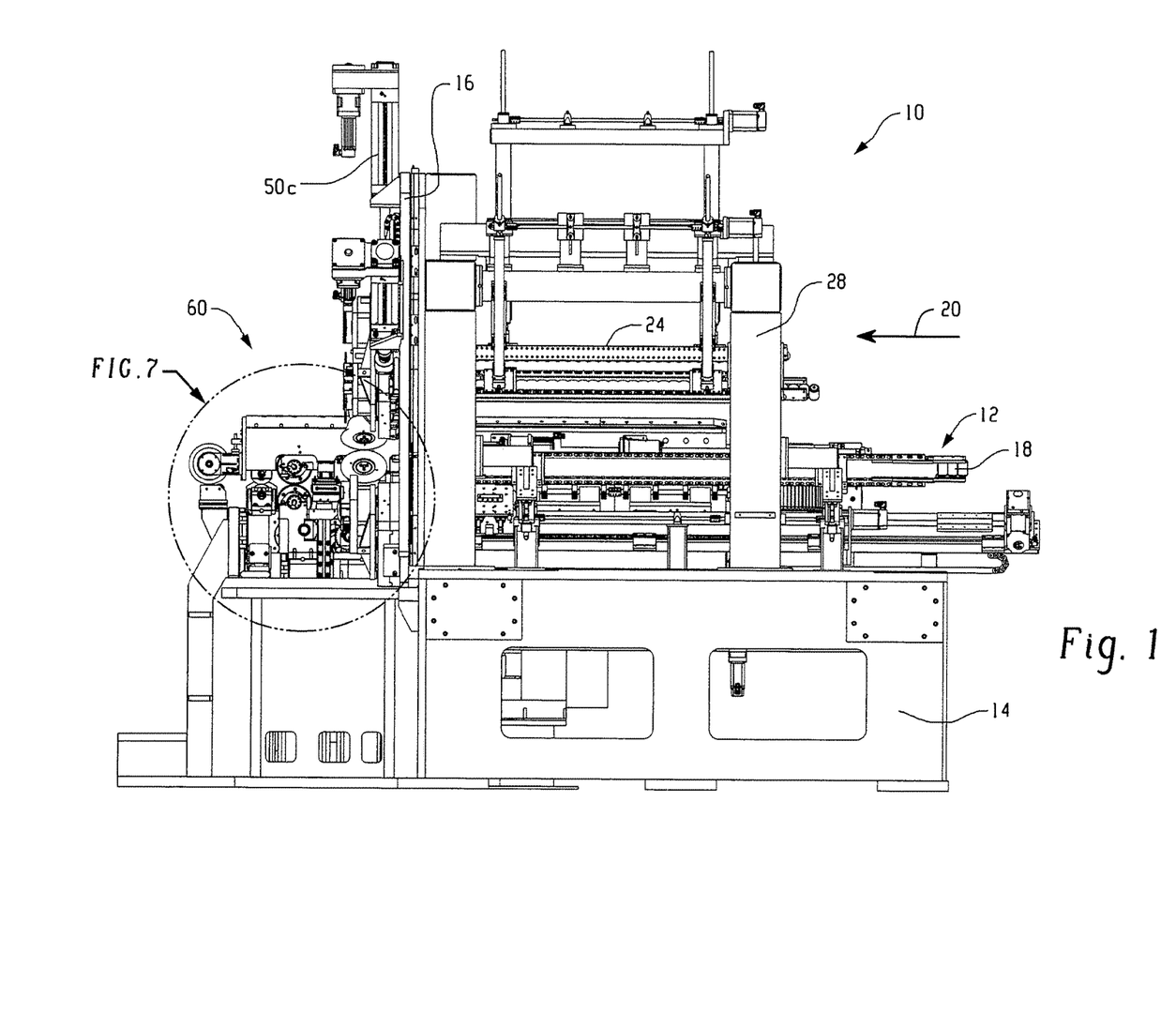
FIG. 1 is a side elevation view of one embodiment of the welding and forging apparatus according to the present application.

In accordance with the present disclosure, an apparatus and method for welding sheet metal into a predetermined geometric profile shape such as an elongated cylindrical shape is provided. As shown in FIG. 1, a welding and forging apparatus 10 for welding a cylinder shape from a sheet material SM (See FIG. 8) is configured to continuously shape and weld a strip of sheet material such as metal or steel from a suitable supply such as a coil or blanks (not shown). The apparatus 10 includes a positioning assembly 12 having a base member 14 and a frame 28. The positioning assembly is operable to receive the sheet material, configure the sheet material in a predetermined orientation such as a generally rounded or cylindrical orientation and translate the sheet material along a process direction 20. As illustrated by FIG. 1, the process direction 20 is from the right hand side of the apparatus 10 towards the left hand side of the apparatus 10 as illustrated by the directional arrow 20.

Figure 2:
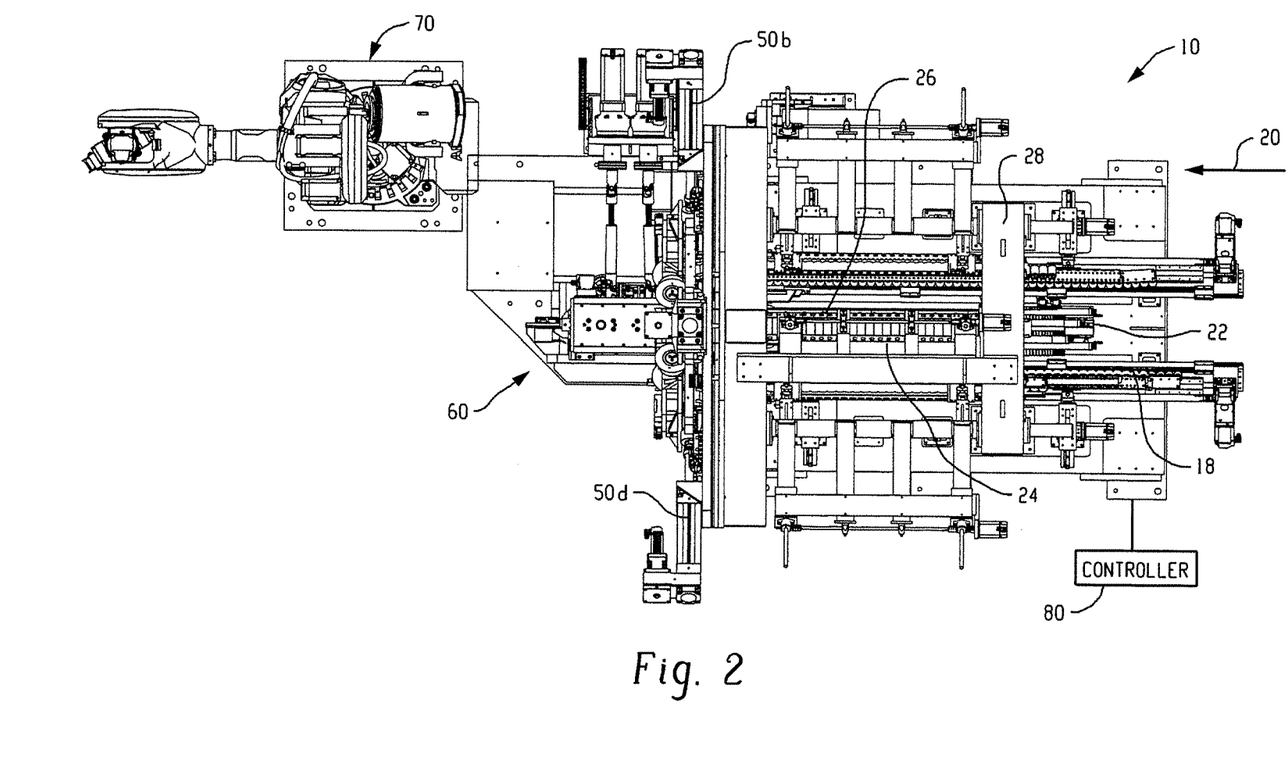
FIG. 2 is a top view of the welding and forging apparatus of FIG. 1.

A guide member 18 is attached to the base member 14 that is configured to guide a first longitudinal edge FE (FIG. 8) and second longitudinal edge SE (FIG. 8) of the sheet material into adjacent alignment along the process direction 20. Additionally, as illustrated by FIG. 2, the base member 14 includes a Z-bar 22 that is configured to translate the sheet material along the process direction 20 and a pair of longitudinal arms 24, 26 extend from frame components 28 and can be adjustable to contain a top and side portion of the sheet material. The arms 24, 26 and frame components 28 can be adjusted as necessary to process the sheet material into the desired predetermined geometric profile shape. As the term, "predetermined geometric profile shape" is used herein, it generally refers to the cross sectional shape of the sheet material. In the preferred embodiments, this shape is generally cylindrical. However, the arms 24, 26 frame components 28 and frame 16 can be configured to process various profile shapes such as oval or multi sided polygon type shapes and this application is not limited in this regard.

Figure 4A:
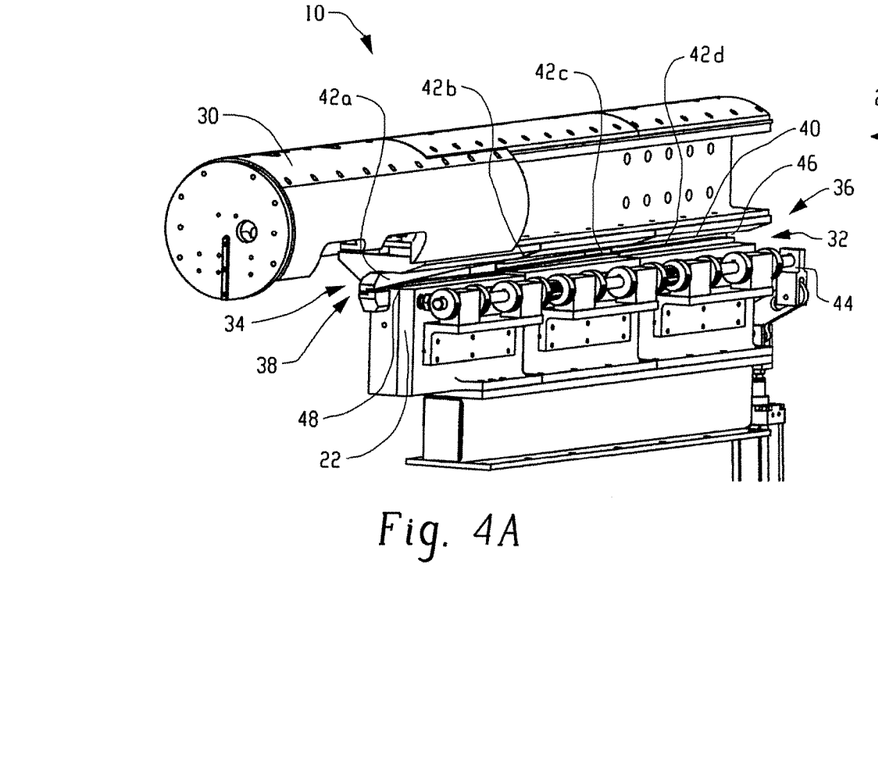
FIG. 4A is a perspective view of a guide member of the welding and forging apparatus of FIG. 1 according to the present application.
Figure 4B:
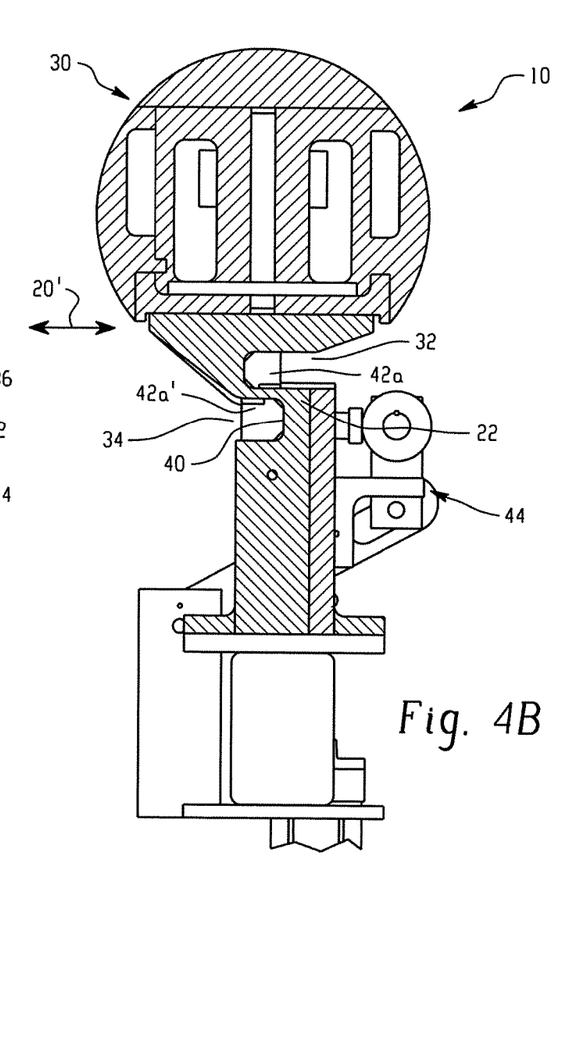
FIG. 4B is a cross sectional view of the guide member of the welding and forging apparatus of FIG. 4A according to the present application.

As illustrated by FIGS. 4A and 4B, the Z-bar 22 of the assembly 10 includes an elongated body having a first channel 32 for receiving the first longitudinal edge FE of the sheet material and a second channel 34 for receiving the second longitudinal edge SE of the sheet material. The Z-bar 22 is generally referred to as the Z-bar 22 as the first channel 32 and second channel 34 are elongated and positioned along opposing sides of the elongated body. Each channel includes a distal end 36 and an opposite proximal end 38 wherein the sheet material SM is configured to be received at the distal ends 36 and guided into adjacent alignment at the proximal ends 38. As illustrated by FIG. 4B, the first channel 32 and second channel 34 include a generally U-shaped profile 40 defining a gap wherein the first and second longitudinal ends of the sheet material are received within the gap as it is translated along the process direction 20.

FIG. 4A illustrates the first and second channels 32, 34 can include a plurality of elongated segments 42a, 42b, 42c and 42d such that each segment 42a-d is configured to be movable relative to the Z-bar 22 to adjust a lateral position of the first and second longitudinal edges of the sheet material. FIG. 4B shows elongated segment 42a' as it is positioned along the second channel 34 relative to elongated segment 42a as it is positioned along the first channel 32.

In one embodiment, a cam assembly 44 is attached to the Z-bar 22 and the plurality of segments 42a-42d such that the rotation of the cam assembly causes individual lateral movement of the segments 42a-d relative to the body 30 of the guide member 18. Slight movements of the segments adjust the sheet material such that the first and second longitudinal edges can be moved in close alignment as the sheet material translates along the process direction. The elongated segments 42a, 42a' are configured to move in a lateral direction 20' relative to the Z-bar 22 as illustrated by the directional arrow in FIG. 4B.

The cam assembly 44 can be automatically operated by a controller 80 that is configured to control the welding and forging apparatus 10 such that the plurality of elongated segments 42a-42d are automatically movable relative to the Z-bar 22 to adjust the lateral position of the first and second longitudinal edges of the sheet material as the sheet material is linearly translated along the process direction 20. In one embodiment, the controller 80 can be configured to receive a signal from a sensor that senses a part in place along base member 14. Exemplarily sensors include but are not limited to electromechanical actuator feedback, LASER gauging structures, electro-optical sensors, fiber-optic sensors, mechanical sensors (such as linear, angular, rotation, and magnetic position sensors) and the like.

In one embodiment, the U-shaped profile 40 of each segment 42a-42d is generally tapered. In another embodiment, the U-shape profile 40 of each segment 42a-42d are also in general alignment such that the segment 42d adjacent the distal end 36 includes a first profile shape 46 and the segment 42a adjacent the proximal end 38 includes a second profile shape 48 such that the first profile shape 46 has a generally wider channel 40 than the second profile shape 48.

Figure 3:
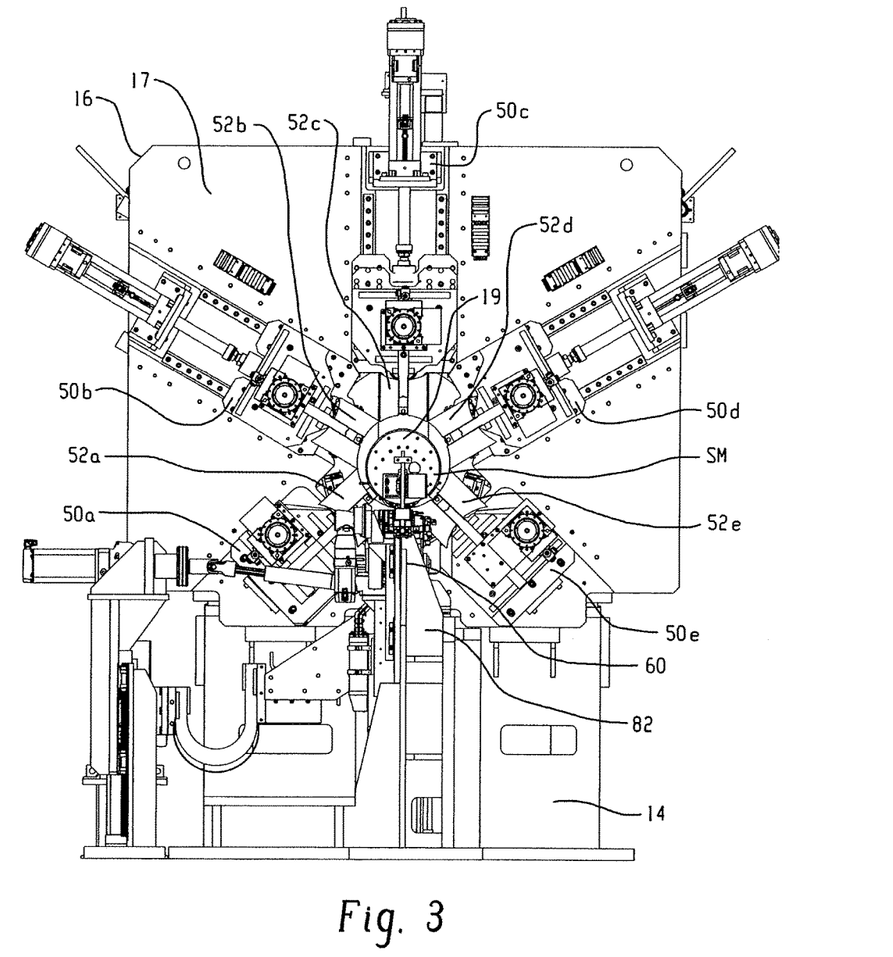
FIG. 3 is a front view of the welding and forging apparatus of FIG. 1.
Figures 5, 6:
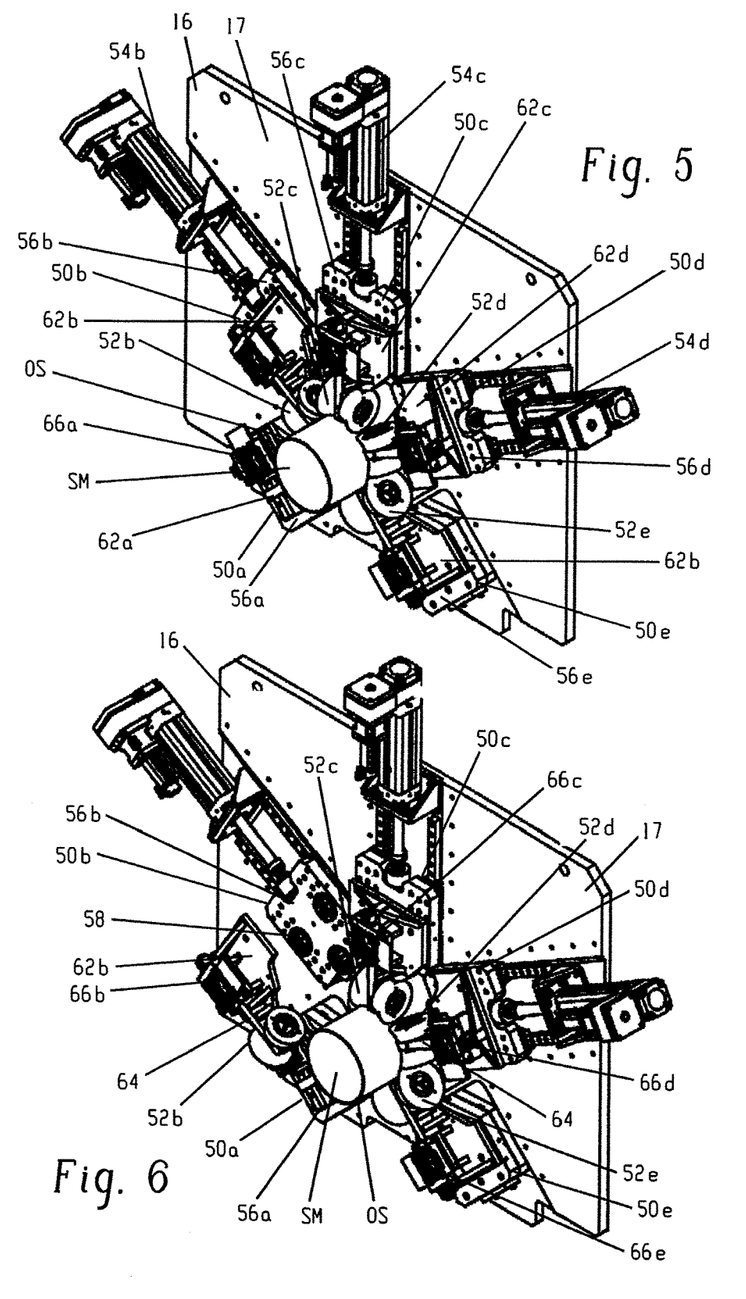
FIG. 5 is a perspective view of a plurality of servo-mechanical arms connected to contoured rolls attached to a frame of the welding and forging apparatus of FIG. 1 according to the present application.
FIG. 6 is a perspective view of the plurality of servo-mechanical arms attached to the frame of the welding and forging apparatus of FIG. 1 wherein one contoured roll is disconnected from the frame according to the present application.

As illustrated by FIGS. 3, 5 and 6, the welding and forging apparatus 10 also includes a plurality of servo mechanical arms 50a, 50b, 50c, 50d and 50e that are attached to the frame 16. Each of the plurality of arms 50a-50e include contoured rolls 52a, 52b, 52c, 52d and 52e, respectively attached to each arm. In one embodiment, the arms are configured to translate inwardly towards the sheet material and outwardly away from the sheet material SM while the rolls are in contact with an outer surface OS of the sheet material to radially adjust the position of the sheet material. In this embodiment, arms 50b, 50c and 50d are configured for radial translation while arms 50a and 50e are static. However, this disclosure is not limited to the arrangement and configuration of static and movable arms as any combination of movable and static arms are contemplated.

In one embodiment, the frame 16 includes a frame surface 17 having an opening 19 to receive the associated sheet material from the Z-bar 22 along the process direction. The plurality of arms 50a-50e are attached to the frame surface 17, aligned along a common plane on the frame 16 and are radially spaced about the opening 19 in the frame 16. In one embodiment, the movement of the plurality of contoured rolls 52b-52d are controlled by the controller 80. The controller 80 sends a signal to the plurality of servo mechanical arms 50b, 50c and 50d to automatically translate inwardly against a circumference C of the sheet material SM and outwardly away from the circumference C of the sheet material SM to adjust the radial position of the sheet material prior to and/or as it is being translated along the process direction 20.

In one embodiment, the rolls 52a-52e can be hourglass type rolls. However, various shaped rolls can be utilized to assist with processing the sheet material into various predetermined geometric profile shapes and this application is not limited to hourglass shaped rolls for processing cylindrical shapes. The rolls 52a-52e are connected to the arms 50a-50e by structural roller plates 62a, 62b, 62c, 62d and 62e, respectively, that allows the rolls to be individually removed and replaced without having to remove other structural members of the apparatus 10, such as the frame 16, the pair of longitudinal arms 24, 26, the frame components 28 or the plurality of arms 50a-50e. This feature allows a user to easily switch out the rolls without having to experience long durations of process shutdown. The rolls can be removed and replaced with various types of rolls that have different shapes and dimensions to process sheet material SM into cylindrical shapes of various diameters. In one embodiment, the nominal diameter of the SM is between about 12" and 30". In particular, the welding and forging apparatus 10 is configured to process sheet material SM into a cylindrical shape having a desired nominal diameter of about 14" (355.6 mm), 16" (406.4 mm), 18" (457.2 mm), 20" (508 mm), 22" (558.8 mm), and 24" (609.6 mm) or other standard metric dimensions such as 350 mm, 400 mm, 450 mm, 510 mm, 560 mm, and 610 mm.

As illustrated by FIGS. 5 and 6, servo mechanical members 54b, 54c and 54d are attached to connection plates 56b, 56c and 56d included with the arms 50b, 50c and 50d, respectively. In this embodiment, the arms 50a and 50e do not have a servo mechanical member but do include connection plates 56a and 56e. The servo mechanical members 54b, 54c and 54d of the arms 50b, 50c and 50d are configured to radially translate the rolls 52b, 52c and 52d, respectively, between about 6" (15 cm) to about 12" (30 cm) and more particularly about 9" (22.5 cm) to about 10" (25 cm). The range distance translated can accommodate the change in roll arms for different nominal diameter types such as the diameter types previously identified and provides enough length to allow for fine adjustment during a particular size process run.

The connection plates 56a-56e each include a plurality of connection points 58 that are configured to align with and connect the roller plates 62a-62e to the connection plates 56a-56e. The roller plates 62a-62e are directly connected to and support the rollers. Each roller plate includes a connection element or beam 64 that directly supports the roll 52a-52e to the roller plate 62a-62e. The connection beam 64 can have various lengths depending on the desired diameter of the tube into which the sheet material is to be processed.

In one embodiment, the connection points 58 are generally annular or puck shaped pneumatic members, such as a workholding system provided by Erowa LTD, and are configured to attach and disconnect from the roller plates through air pressure provided by a pneumatic system (not shown). The roller plates 62a-62e include an attachment ring 66a-66e positioned along the roller plates 62a-62e, respectively, opposite from the connection points 58. The attachment rings 66a-66e can be an end effector or other robotic tool changer such as those provided by ATI Industrial Automation. In this embodiment, the servo mechanical members 54b, 54c and 54d are operable to radially translate the connection plates 56b-56d, the roller plates 62b-62d, the connection beams 64 and the rolls 52b-52d to abut against the outer surface OS of the sheet material SM and adjust a radial position of the sheet material as it is translating along the process direction.

As illustrated by FIG. 6, the roll 52b and roller plate 62b are removed from the connection plate 56b of arm 50b.

Figure 7:
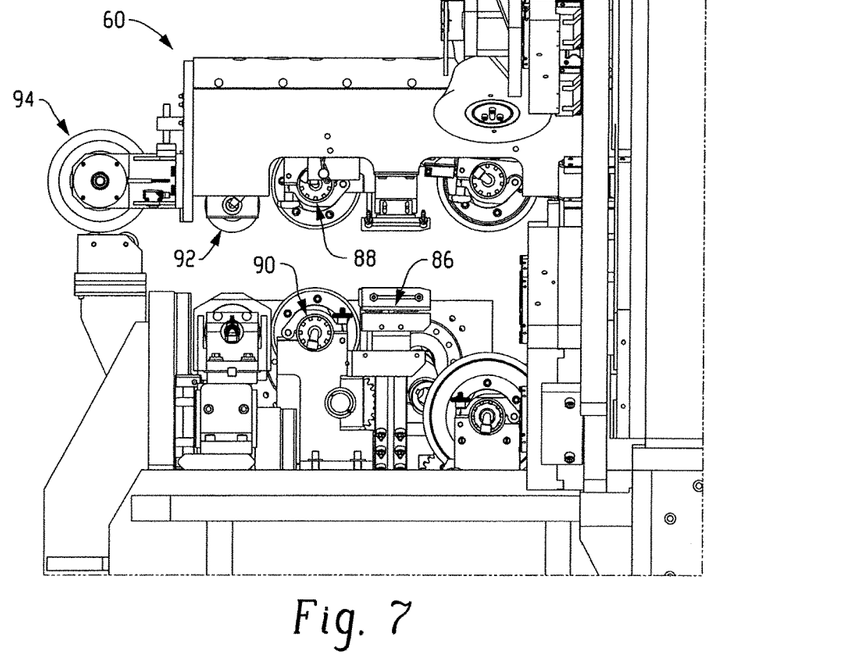
FIG. 7 is an enlarged portion of FIG. 1.

A welding and forging assembly 60 (also referred to as a joining assembly) as illustrated by FIGS. 1-3 and best shown in FIG. 7, is provided downstream of the guide member 18 and the plurality of arms 50a-50e for welding and subsequently forging a seam between the first longitudinal edge FE and the second longitudinal edge SE of the sheet material. In one embodiment, the welding and forging assembly 60 is configured to provide a solid phase bond along the edges in accordance with a method of joining metal sheet or strip described by U.S. Pat. No. 3,301,994 or 5,676,862, both of which are incorporated herein in their entirety.

However, this application is not limited to these welding methods. The welding and forging assembly 60 is positioned adjacent to and in alignment with the proximal end 38 of the first and second channels 32, 34.

Figure 8:
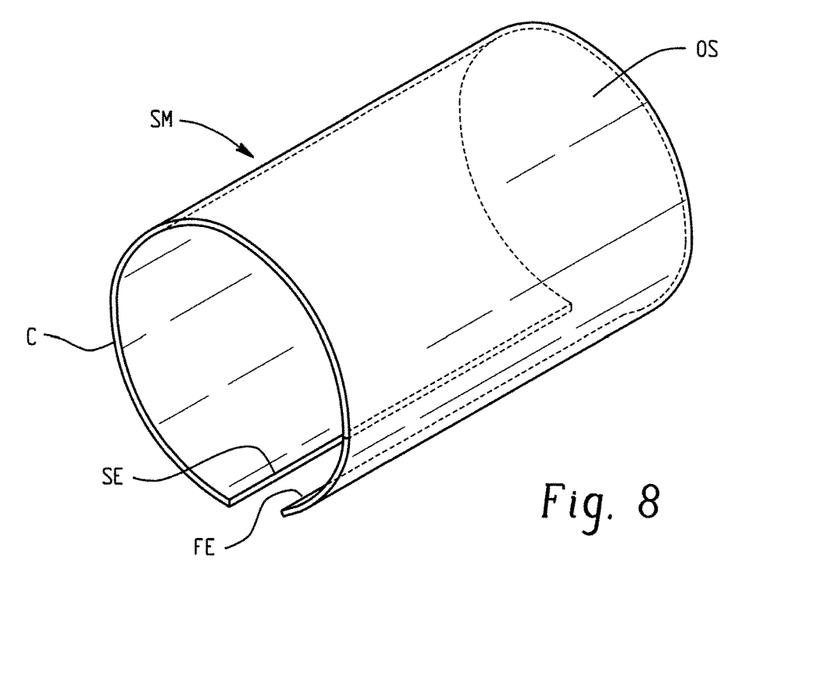
FIG. 8 is a perspective view of a portion of sheet material.

In one embodiment, the seam includes specific alignment with the first longitudinal edge FE and the second longitudinal edge SE to ensure a smooth, straight weld that is not susceptible to leakage. More particularly, the seam is created by an overlap of the first longitudinal edge FE and the second longitudinal edge SE (FIG. 8). It is preferred that the amount of overlap is approximately equal to the thickness of the sheet material. In one embodiment, the controller 80 activates the cam assembly 44 to perform adjustments to the lateral and radial positions of the sheet material by movement of the segments 42a-42d and/or movement of the arms 50b-50d. Additionally, the first channel 32 can be located above the second channel 34 and be arranged to position the first longitudinal edge FE in overlap relation to the second longitudinal edge SE as the sheet material translates along the process direction 20.

The system controller 80 controls a voltage source to apply an electric potential to the plurality of servo mechanical arms 50b-50d and the cam assembly 44. In one embodiment, the controller 80 includes one or more processors that is programmed to control the position of the first longitudinal edge FE relative to the second longitudinal edge SE. The controller 80 is also programmed to adjust a variable voltage source to provide the electrical potential that is introduced to the welding and forging assembly 60 and the amount of both a voltage magnitude, ie., high or low, and the amount of amperage draw throughout the duration of the welding and forging process. Additionally, the controller 80 is programmed to control the rate of translation of the sheet material as it is translated along the process direction 20 and the 1 70.

The amount of power required by the welding and forging apparatus 10 is in part dependent on the thickness of the sheet material SM to be welded. In particular, as the thickness of the sheet material SM increases, the amount of electrical potential also increases.

With reference to FIG. 7, the welding and forging assembly 60 further includes an induction heating element 86 and a pair of forging wheels 88 and 90 for forging the previously welded seam as it passes therethrough. In one embodiment, the welding and forging assembly 60 partial bonds the narrowly overlapped sheet ends with a leading set of weld wheels (e.g., via resistance welding) as described above, and then heats (e.g., via induction heating) the partially bonded sheet ends to a significant temperature, for example between 1500 F and 2400 F, and forges the heated seam with the closely positioned forging wheels. The action of the induction heating and forging increases the quality and scope of the "solid phase" bond weld (sheet) interface while also reducing the weld to near-parent metal thickness ratio. A reduced thickness ratio and increased weld quality, as compared to a conventional resistance weld bond, is achieved by the apparatus 10. Planishing wheels 92 and 93, and brush 94 are also provided for finishing processing of the welded/forged seam.

Figure 9:
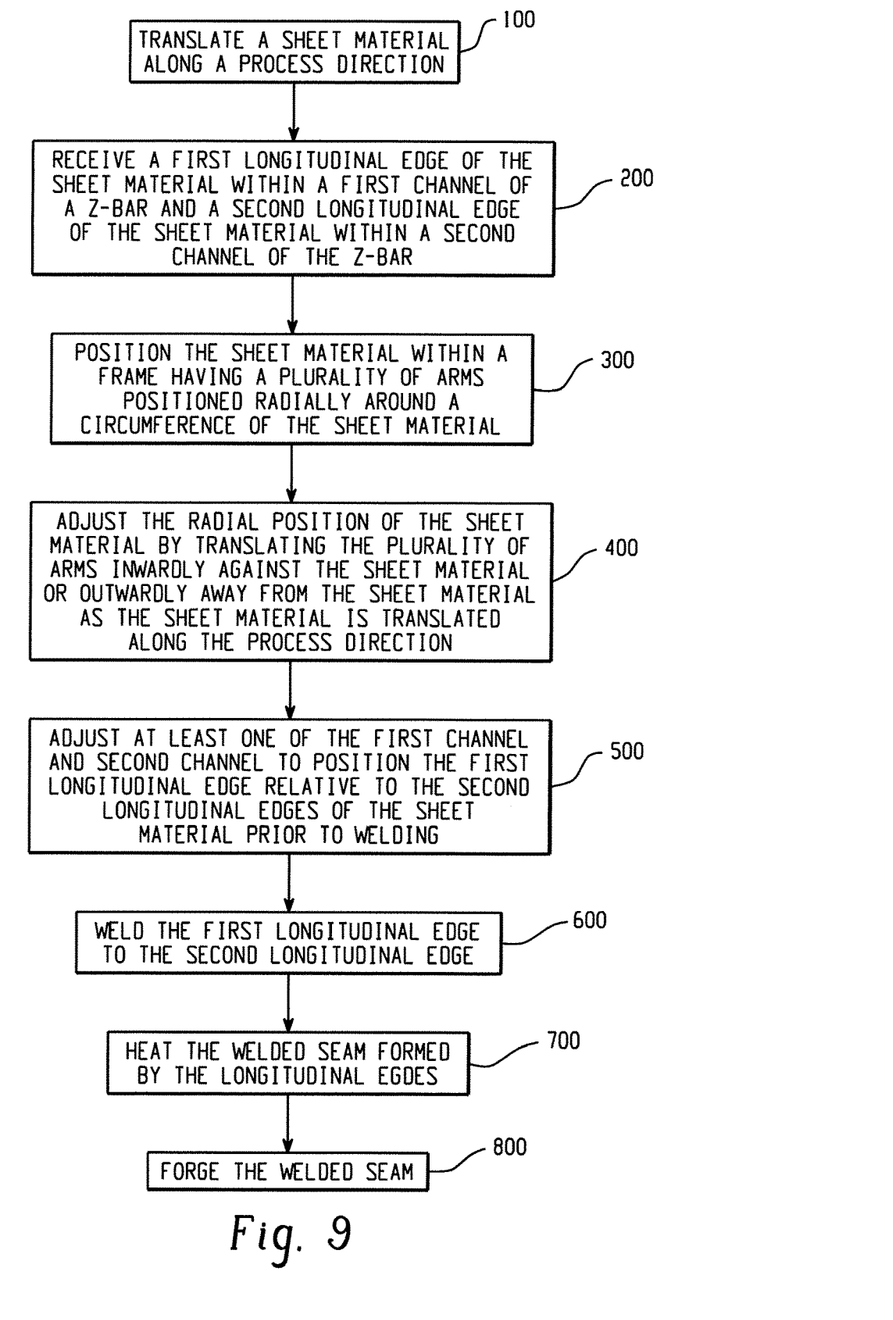
FIG. 9 is a flow chart of a method of welding and forging the sheet material into a predetermined geometric profile shape such as a cylindrical shape.

In operation, the sheet material SM is translated along a process direction 20 in a step 100, as illustrated by the flowchart of FIG. 9. In one embodiment, the sheet material SM is formed into a generally circular cross sectional shape prior to engaging the welding and forging apparatus 10. In another embodiment, the welding and forging apparatus 10 can include the framework structure that forms the sheet material SM into a generally circular cross sectional shape to allow the sheet material SM to be received within the Z-bar 22 of the welding and forging apparatus 10. In a step 200, the first longitudinal edge FE of the sheet material SM is received within a first channel 32 of the Z-bar 22 and the second longitudinal edge SE of the sheet material SM is received within the second channel 34 of the Z-bar 22. In a step 300, the sheet material SM is positioned within the frame 16 with the plurality of arms 50 positioned radially around the circumference C of the sheet material SM. In a step 400, a radial position of the sheet material SM is adjusted by translating at least one of the plurality of arms 50 inwardly against the sheet material or outwardly away from the sheet material as the sheet material is translated along the process direction 20. In a step 600, the first longitudinal edge FE is welded to the second longitudinal edge SE. In a step 700, at least a portion of the welded longitudinal edges FE and SE are heated, such as by an induction coil. In a step 800, the seam of the welded longitudinal edges FE and SE are forged.

Additionally, in a step 500, at least one of the first channel 32 and second channel 34 can be adjusted to position the first longitudinal edge FE relative to the second longitudinal edge SE of the sheet material prior to the welding step 600.

The apparatus of the present disclosure is capable of producing a welded/forged article with a welded seam thickness (prior to forging) typically 20%-35% over parent material thickness. Some weld over thickness can typically be provided to allow for material to forge. The post forge weld zone thickness is typically 0% to 20% of parent material thickness. These ranges will vary with machine settings, weld material chemistry, and physical properties.

Figure 10:
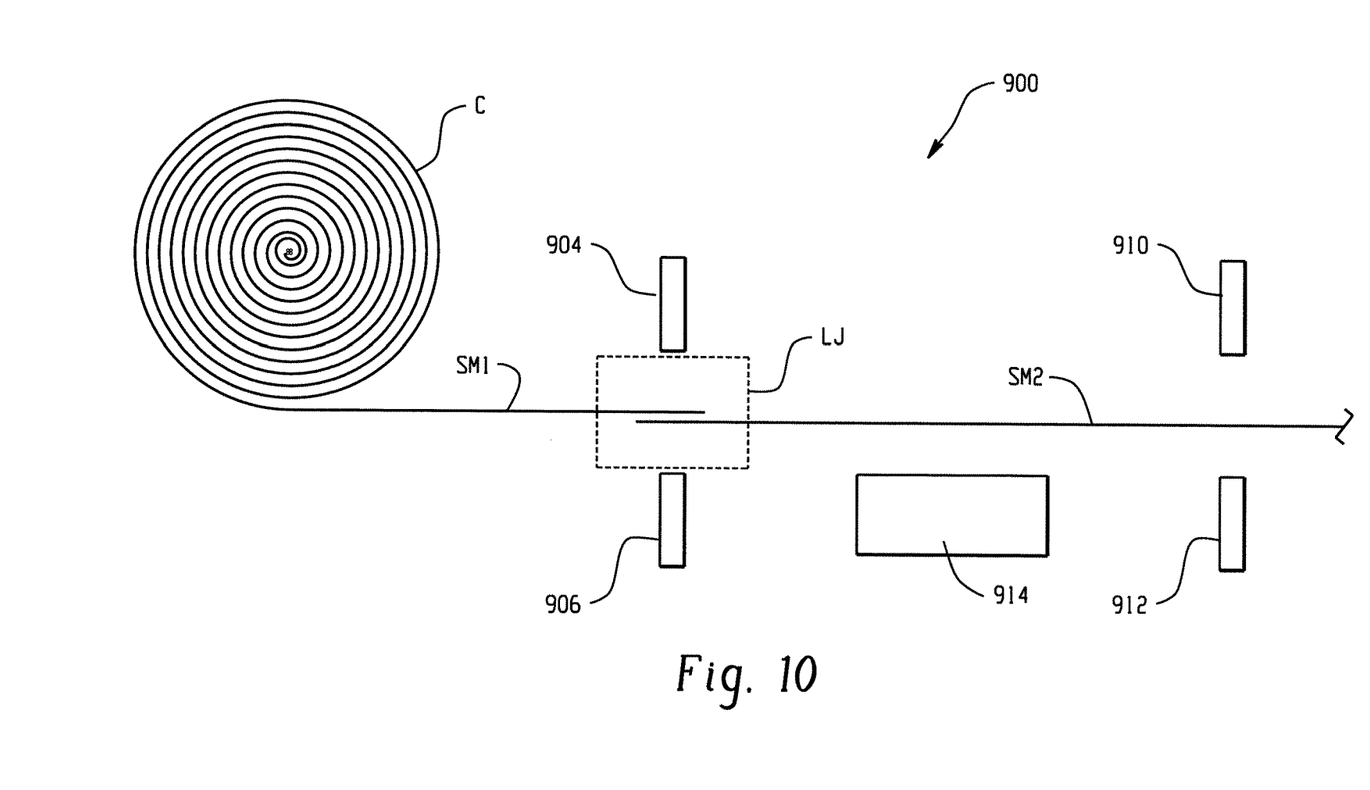
FIG. 10 illustrates schematic diagram of a system for welding and forging a lap joint.

Turning to FIG. 10, an exemplary apparatus for joining overlapped end portions of one or more associated sheet materials, such as steel coils C or the like, is illustrated and identified generally by reference numeral 900. In many metal strip and sheet processing operations, it is desirable to maintain a continuous movement of strip through the processing line so that periodic threading of a new strip length through the entire line is avoided. Thus, it is common to provide at the entry end of the strip line a welder device for joining the leading end of a new coil or length of strip with the trailing end of a previous coil or length. In most cases so-called lap seam welders are provided for this purpose, with which the leading and trailing ends of successive coils are welded in overlapped relation. However, in many cases it can be impractical or otherwise undesirable to permit an overlapped strip section to pass through certain of the line components, such as roller levelers, for example, in which case flash-butt welding equipment is often employed. In the latter case, the ends of successive coils are abutted and fused so that no overlapping of strip thicknesses results. The present disclosure sets forth a method and apparatus for welding/forging a lap seam that produces an extremely flat seam that is suitable for use in virtually all applications where successive sheet materials need to be joined together.

In the illustrated embodiment, a lap joint LJ is formed by overlapping end portions of two uncoiled portions of sheet material SM1 and SM2. A wide variety of systems are available for positioning and maintaining sheet material in an overlapped configuration. Aspects of the present disclosure can be used with a wide variety of such existing systems.

The apparatus 900 generally includes a positioning assembly operable to configure end portions of respective sheet materials SM1 and SM2 in an overlapped configuration (positioning assembly not shown in FIG. 10), a welding assembly including at least a pair of opposed weld wheels 904 and 906 for applying a current to at least the overlapped end portions LJ of the sheet materials for at least partially bonding together the overlapped end portions, and a forging assembly including at least a pair of opposed forging wheels 910 and 912 for creating a solid-phase bond between the overlapped end portions of the sheet materials. A heating unit 914 is provided for heating the overlapped portion LJ of the sheet materials prior to forging.

It will be appreciated that the welding and forging process disclosed in FIG. 10 is identical to the welding and forging process described in connection with FIGS. 1-9. In FIG. 10, however, two sheet materials are being joined instead of a single sheet material formed into a shape with overlapping edges and the welding and forging wheels are configured to move along the overlapping edges of the two sheet materials (e.g., perpendicular to a process direction). It should therefore be understood that the welding and forging apparatus and methods of the present disclosure are applicable to a wide variety of applications wherein overlapping edges of sheet material are to be joined. Further, in the case of high carbon steels that generally become more brittle as strength increases, the forging portion of the disclosed method not only bonds the material but has a tempering effect on the steel that results in a more homogeneous grain structure than a weld-only approach to joining the material.

The exemplary embodiment has been described with reference to the preferred embodiments. Modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A welding apparatus for forming and welding a geometric profile shape from an associated sheet material comprising:
   a positioning assembly including a base member and a frame that is operable to receive the associated sheet material, configure the associated sheet material in a predetermined orientation and translate the associated sheet material along a process direction;
   a guide member attached to the base member that is configured to guide a first longitudinal edge and a second longitudinal edge of the associated sheet material into adjacent overlapping alignment along the process direction; and
   a welding assembly for welding a seam between the first longitudinal edge and the second longitudinal edge of the associated sheet material;
   wherein the guide member includes a first channel configured for receiving the first longitudinal edge of the associated sheet material and a second channel configured for receiving the second longitudinal edge of the associated sheet material, the first channel and second channel each having respective surfaces against which the first and second longitudinal edges of the associated sheet material are adapted to abut to determine an amount of overlap of the first and second longitudinal edges;
   wherein a position of at least one of the respective surfaces of the first or second channel is adjustable to adjust the amount of overlap of the first and second longitudinal edges of the associated sheet material; and
   wherein the guide member further comprises at least one actuator for displacing at least one of the respective surfaces of the first or second channel of the guide member.

2. The welding apparatus of claim 1, further comprising a controller that is configured to control the at least one actuator.

3. The welding apparatus of claim 2, further including:
a sensor configured to sense an overlap of the first longitudinal edge relative to the second longitudinal edge of the associated sheet material and generate an overlap signal.

4. The welding apparatus of claim 3, wherein the controller is further configured to:
receive the overlap signal;
analyze the overlap signal to determine whether the sensed overlap conforms with a preselected overlap;
move at least one of the respective surfaces of the guide member until the sensed overlap conforms to the preselected overlap; and
control the welding apparatus to weld the first and second longitudinal edges in coordination with advancement of the associated sheet material as it translates along the process direction.

5. The welding apparatus of claim 1, further comprising a plurality of arms attached to the frame, each arm including a roll, wherein at least one roll is configured to be translated inwardly against the associated sheet material and outwardly away from the associated sheet material to adjust a radial position of the associated sheet material, wherein the plurality of arms are aligned along a common plane on the frame and are radially spaced about a circumference of the associated sheet material.

6. The welding apparatus of claim 5, further including:
a controller that is configured to control the welding apparatus such that at least one of the plurality of rolls can be automatically translated inwardly against the associated sheet material and outwardly away from the associated sheet material to adjust the radial position of the associated sheet material as the associated sheet material is translated along the process direction.

7. The welding apparatus of claim 5, wherein at least one roll is an hourglass roll.

8. The welding apparatus of claim 1, wherein the guide member includes a body having the first channel and the second channel, the first channel and second channel each include a distal end and an opposite proximal end wherein the associated sheet material is configured to be received at the distal ends and guided into adjacent alignment at the proximal ends, at least one of the first and second channels includes at least one elongated segment, the at least one elongated segments being configured to be movable relative to the body of the guide member to adjust a lateral position of at least one of the first or second longitudinal edges of the associated sheet material for achieving a desired overlap.

9. A method of forming a sheet material into a predetermined geometrical profile shape to be welded, the sheet material having a first longitudinal edge and a second longitudinal edge, the method comprising:
setting an amount of overlap of the first longitudinal edge and the second longitudinal edge by adjusting a guide member having:
a first channel opening towards a first direction and having a first surface adapted to receive the first longitudinal edge of the associated sheet material in abutting engagement therewith; and
a second channel opening towards a second direction opposite the first direction and having a second surface adapted to receive the second longitudinal edge of the associated sheet material in abutting engagement therewith;
wherein the guide member further comprises at least one actuator for displacing at least one of the first or second surfaces laterally; and
wherein a position of at least one of the first or second surfaces is adjustable to change an amount of overlap of the first and second longitudinal edges of the associated sheet material; and
receiving the first longitudinal edge of the sheet material within the first channel of the guide member and the second longitudinal edge of the sheet material within the second channel of the guide member;
wherein the setting of the amount of overlap includes adjusting at least one of the first and second channels using the actuator to change the position of a respective one of the first or second longitudinal edges of the sheet material relative to the other of the first or second longitudinal edges of the sheet material.

10. The method of claim 9, wherein the guide member includes a body having the first channel and the second channel, at least one of the first and second channels includes at least one elongated segment, the at least one elongated segment being configured to be movable relative to the body of the guide member to adjust a lateral position of at least one of the first or second longitudinal edges of the associated sheet material for achieving a desired overlap.

11. The method of claim 9, further comprising adjusting at least one of the first channel or second channel to position the first longitudinal edge relative to the second longitudinal edge of the sheet material prior to welding.

12. The method of claim 9, further comprising:
adjusting the radial position of the sheet material by translating at least one of a plurality of arms inwardly against the sheet material or outwardly away from the sheet material as the sheet material is translated along the process direction; and
welding the first longitudinal edge to the second longitudinal edge.

13. A guide member for an apparatus for welding a predetermined geometric profile shape from an associated sheet material, the guide member configured to guide a first longitudinal edge and a second longitudinal edge of the associated sheet material into adjacent overlapping alignment along a process direction, comprising:
a first channel opening towards a first direction and having a first surface adapted to receive a first longitudinal edge of the associated sheet material in abutting engagement therewith; and
a second channel opening towards a second direction opposite the first direction and having a second surface adapted to receive a second longitudinal edge of the associated sheet material in abutting engagement therewith;
wherein a position of at least one of the first or second surfaces is adjustable to change an amount of overlap of the first and second longitudinal edges of the associated sheet material; and
wherein the guide member further comprises at least one actuator for displacing at least one of the first or second surfaces laterally.

14. The guide member of claim 13, wherein the at least one actuator includes a cam assembly.

15. The guide member of claim 14, further comprising a controller that is configured to control the cam to adjust the lateral position of at least one of the first or second longitudinal edges of the associated sheet material.

16. The guide member of claim 13, wherein the guide member includes a body having the first channel and the second channel, the first channel and the second channel each include a distal end and an opposite proximal end wherein the associated sheet material is configured to be received at the distal ends and guided into adjacent alignment at the proximal ends, at least one of the first and second channels includes at least one elongated segment, the at least one elongated segment being configured to be movable relative to the body of the guide member to adjust a lateral position of at least one of the first or second longitudinal edges of the associated sheet material for achieving a desired overlap.

\* \* \* \* \*